United States Patent
Stickle (10) Patent No.: US 9,246,688 B1
(45) Date of Patent: Jan. 26, 2016

(54) DATASET LICENSING

(71) Applicant: Amazon Technologies, Inc., Reno, NV (US)

(72) Inventor: Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/037,124

(22) Filed: Sep. 25, 2013

(51) Int. Cl.
*H04L 29/06* (2006.01)
*H04L 9/32* (2006.01)

(52) U.S. Cl.
CPC ............ *H04L 9/3247* (2013.01); *H04L 9/3223* (2013.01)

(58) Field of Classification Search
USPC .......................................................... 726/17
See application file for complete search history.

(56) References Cited

U.S. PATENT DOCUMENTS

| | | | |
|---|---|---|---|
| 7,523,132 B2* | 4/2009 | Altounian et al. | |
| 8,429,181 B2* | 4/2013 | Gutstadt et al. | 707/758 |
| 8,725,648 B2* | 5/2014 | Ross | 705/59 |
| 8,799,170 B2* | 8/2014 | Mallardo et al. | 705/59 |
| 8,861,937 B2* | 10/2014 | Ramaswamy et al. | 386/291 |
| 2005/0092825 A1* | 5/2005 | Cox et al. | 235/375 |
| 2007/0067309 A1* | 3/2007 | Klein et al. | 707/10 |
| 2007/0187266 A1* | 8/2007 | Porter et al. | 206/232 |
| 2008/0005086 A1* | 1/2008 | Moore | 707/3 |
| 2008/0017722 A1* | 1/2008 | Snyder et al. | 235/494 |
| 2008/0208692 A1* | 8/2008 | Garaventi et al. | 705/14 |
| 2013/0086693 A1* | 4/2013 | Laverdiere-Papineau et al. | 726/28 |
| 2013/0326215 A1* | 12/2013 | Leggette et al. | 713/156 |
| 2014/0172951 A1* | 6/2014 | Varney et al. | 709/203 |
| 2014/0180826 A1* | 6/2014 | Boal | 705/14.66 |
| 2014/0189525 A1* | 7/2014 | Trevisiol et al. | 715/745 |
| 2014/0201126 A1* | 7/2014 | Zadeh et al. | 706/52 |
| 2014/0279838 A1* | 9/2014 | Tsirogiannis et al. | 707/603 |
| 2014/0282016 A1* | 9/2014 | Hosier, Jr. | 715/733 |
| 2014/0337375 A1* | 11/2014 | Yue | G06F 17/30424 707/769 |
| 2014/0337461 A1* | 11/2014 | Lipstone et al. | 709/213 |

* cited by examiner

*Primary Examiner* — Mahfuzur Rahman
(74) *Attorney, Agent, or Firm* — Thorpe North & Western LLP (57) ABSTRACT

A data licensing technology is described. A dataset is provided with license tags attached to data items in the dataset. A license file is deployed having a license tag. A query is run against the dataset with the license file, and data items are filtered out that do not have the license tag attached.

17 Claims, 9 Drawing Sheets

DATASET LICENSING

BACKGROUND

Large datasets are often licensed by dataset consumers. As an example, a geospatial dataset provider may place 900 terabytes (TB) of LiDAR data representing the United States (US) into a distributed database. The geospatial dataset provider may then sell access to the dataset to dataset consumers. Dataset consumers may, as an example, use the dataset to generate digital elevation models.

Because of the size of some datasets or out of a desire to retain control of some datasets, access to some datasets may include running applications against the datasets directly. Accordingly, the dataset may remain in a storage medium or storage service with an application accessing the storage medium directly, rather than the dataset being duplicated onto another storage medium and sent to a dataset consumer for processing locally by the dataset consumer.

Map-reduce is a programming model for processing large datasets using a parallel, distributed method on a cluster of processing devices. A map-reduce application includes a map procedure that performs filtering and sorting and a reduce procedure that performs a summary operation. A map-reduce application generally runs on a cluster in parallel fashion. One framework implementation for running map-reduce applications is APACHE™ HADOOP®. The map-reduce programming model may be applied to the large datasets described above in order to provide desired processing results from the large datasets.

DETAILED DESCRIPTION

A dataset licensing technology is described that may allow a dataset provider to manage licenses issued to dataset consumers. As an example, various hedge funds may execute an analysis on large, common datasets such as historical stock ticker data from a dataset provider. Hedge fund companies or other dataset consumers, often spend large sums of money for access to these vast datasets. In this way, the various hedge funds may be dataset consumers. While some hedge funds may bring copies in-house so that they may run analysis applications against these datasets, some datasets may remain within a distributed database where the analysis applications may be run on a virtualized computer cluster associated with the distributed database, rather than duplicating the dataset onto another storage medium and sending the dataset to a dataset consumer for processing locally by the dataset consumer.

The datasets are often large and the applications are often computationally intensive. As such, distributed computing techniques, such as the map-reduce model may be used to quickly and efficiently execute these applications against the datasets. The map-reduce model is a programming model for processing large datasets using a parallel, distributed application on a virtualized computer cluster. Because of the proprietary nature of some of the datasets, and because some dataset consumers may wish to purchase access to a limited portion of the datasets, dataset providers may desire a mechanism to license a portion of a dataset to a dataset consumer and enforce the license when a dataset consumer's applications and/or queries run against the dataset. In particular, data items in the dataset may be tagged with license tags, and a license file having a license tag may be deployed to the dataset consumer. The consumer may then package the license file with a query and/or application and submit package to be executed against the dataset. The application and/or query may be run against the dataset and data items that do not have the license tag from the license file attached may be filtered out.

Figure 1:
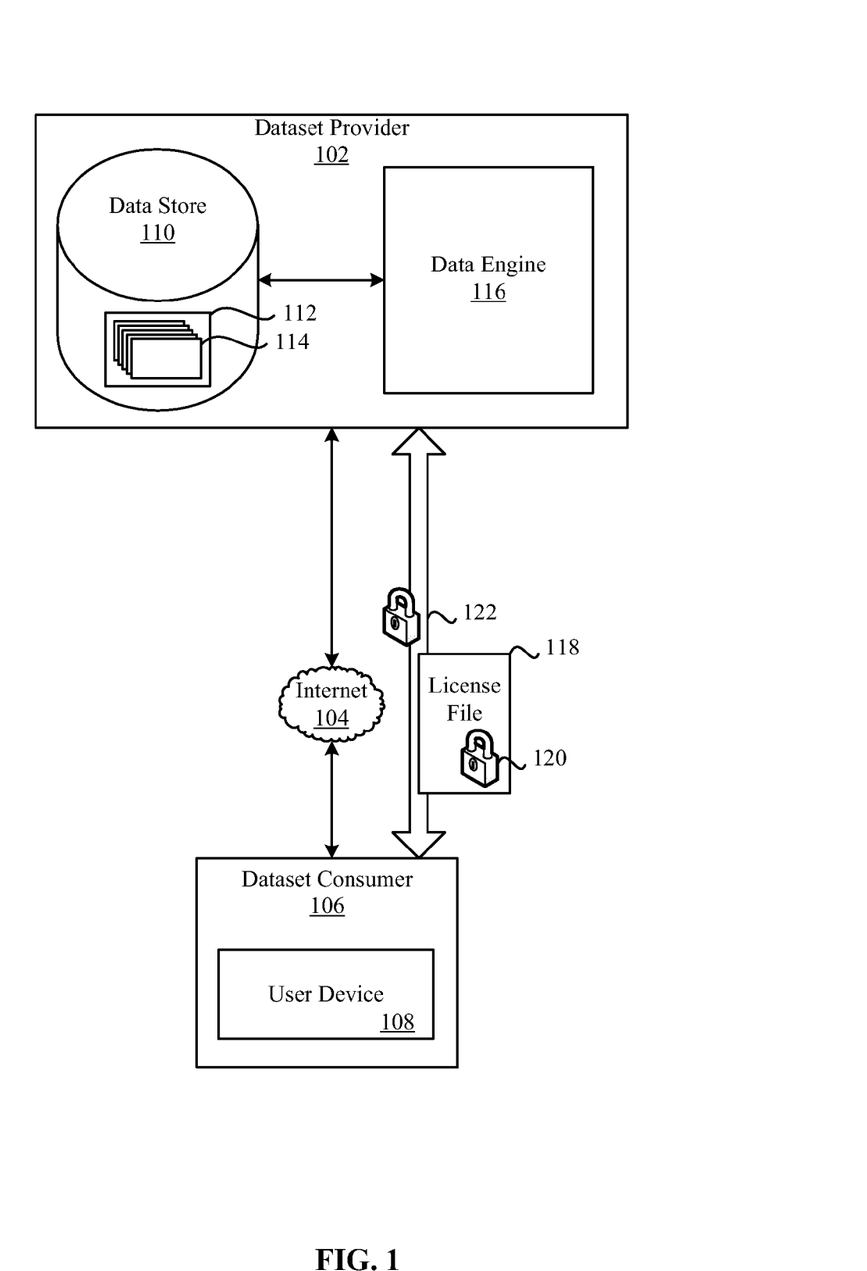
FIG. 1 is a schematic overview of an example dataset licensing system.

FIG. 1 is a schematic overview of an example dataset licensing system 100. The system 100 may include a dataset provider 102 and a dataset consumer 106 communicatively connected through the Internet 104. As an example, the dataset provider 102 may be a government agency offering census data located in Washington, D.C., while the dataset consumer may be a medical research facility in Omaha, Nebr. that may be using census data to correlate certain diseases with demographic information provided through the census data. Thus in the example, the dataset provider 102 and the dataset consumer 106 may be located in separate parts of the world and may be communicatively connected through the Internet 104. It should be appreciated by those skilled in the art, however, that the dataset provider 102 and the dataset consumer 106 may be communicatively connected over a private network, or may even be located in the same building or office.

The dataset consumer 106 may have a user device 108 to communicate with the dataset provider 102 over the Internet 104. The user device 108 may include devices such as desktop computers, laptops, personal digital assistants (PDAs), wireless cellular communication devices (e.g. smart phones), computer terminals or any other computational device that may electronically connect to the dataset provider 102.

The dataset provider 102 may have a data store 110 having a dataset 112 stored thereon. The dataset 112 may include multiple data items 114. Each data item 114 may contain multiple rows of data. A data engine 116 may provide interaction with the dataset 112 stored on the data store 110. Therefore, data items 114 in the dataset 112 may be defined, manipulated and controlled through the data engine 116. The data items 114 in the dataset 112 may have attached license tags identifying one or more licenses related to the data items. For example, the dataset 112 may be LiDAR data representing the United States, and the data items 114 may include a licensing tag representing a licensing subset of the dataset 112. For instance the dataset provider 102 may divide the dataset 112 into geographic areas such as states in the United States. Thus, the data items 114 may contain a licensing tag such as "Colorado" or "New Hampshire." In this way, the dataset 112 may be provided with license tags attached to the data items 114 in the dataset 112. More specifically, there may be one licensing tag for each data item 114 or there may a tag with each data row in the data item.

The dataset provider 102 may generate a license file 118 having a license tag attached to enable a customer to access at least one data item 114 to which the customer may purchase access. For example, the dataset provider 102 may generate a license file 118 with a license tag of "Colorado" where the dataset consumer 106 may be interested in licensing a subset of the dataset 112 including geospatial data in the State of Colorado. The license file 118 may include an authentication mechanism 120. One example of an authentication mechanism may be calculating the hash value for license file 118 and signing the hash value in a license file 118 with a key to form a signature. For instance, a cryptographic hash function, such as the secure hash algorithm 1 (SHA-1) designed in part by the United States' National Security Agency (NSA), may be used to calculate the hash value for the license file 118. Other existing hashing functions may be used too. Cryptographic hash function are generally considered hash functions that take an arbitrary block of data and return a fixed-size bit string called the hash value. Hash values calculated with cryptographic hash functions generally are such that any accidental or intentional change to the input data will, with very high probability, change the calculated hash value.

In another example, the license file 118 may be signed using a digital signature. A digital signature generally includes generating a pair of asymmetric cryptography keys. Using a private key from the pair of asymmetric cryptography keys a digital signature may be produced by the dataset provider. Using a public key from the pair of asymmetric cryptography keys, a signature may be verified as authentic. One example of an algorithm for generating a pair of asymmetric cryptograph keys is the RSA method.

Upon providing licensing access to the dataset 112, the dataset provider 102 may send the dataset consumer 106 the license file 118 over the Internet 104. In doing so, the dataset provider 102 and the dataset consumer 106 may desire secure communication of the license file 118 over the Internet 104. To that end, a secure communication connection 122 may be used to transmit the license file 118 from the dataset provider 102 to the dataset consumer 106 over the Internet 104. For instance, Hypertext Transfer Protocol Secure (HTTPS) may be used or a virtual private network (VPN) tunnel may be created through the Internet 104 to provide the secure communication connection 122.

Once the dataset consumer 106 has the license file 118, the dataset consumer 106 may send the license file with a query to the dataset provider 102. For example, the dataset consumer 106 may write an application with one or more queries therein and package the application with the license file 118 for submission to the dataset provider 102. Thus, the dataset provider 102 may receive the license file 118 with a query. The data engine 116, in one example, may then be used to run the application or the queries received. Prior to the data engine 116 running the queries, the dataset provider 102 may wish to authenticate the license file 118. For instance, the dataset provider 102 may want to know whether the license file 118 has been tampered with, or whether the license file 118 has been fabricated to masquerade as a genuine license file. For example, the dataset consumer 106 may have licensed a "Colorado" subset of a geospatial dataset. In doing so, the license file 118 may have been generated referencing "Colorado" as a license tag. However, an unscrupulous dataset consumer may modify the license file 118 to reference the entire United States, for instance. Thus, the dataset provider 102 may authenticate the license file 118 to ensure authenticity of the license file 118 and thereby enforce the license file 118 by checking the authentication mechanism 120.

In communicating the query and the license file 118 from the dataset consumer 106 to the dataset provider 102, the secure communication connection 122 may be used. After receiving the query and license file 118, the query may be run against at least a portion of the dataset 112 using, for example, the data engine 116, and data items 114 may be identified that have the license tag in the license file 118 attached thereto. Identified data items may then, for example, be filtered out. Alternatively, the query may be run against identified data items that have the license tag from the license file attached. In this way, the query may be run against a licensed subset of the dataset 112. A resultant set may be stored on the data store 110 and notification made to the dataset consumer 106, or alternatively, the resultant set may be communicated to the dataset consumer 106 over the secure communication connection 122 or directly over the Internet 104 via an unprotected connection. In this way, the technology may provide assurance to a dataset provider that a dataset consumer may have access to a licensed portion of a dataset while being restricted from unlicensed portions of the dataset when running an application and/or query against the dataset.

In an alternative example for FIG. 1, the dataset provider 102 may not send the dataset 112 to the dataset consumer 106 but the dataset may be copied to a processing instance or processing engine (not shown) on the dataset provider 102 side. Once the dataset 112 has been processed, then the results of processing the dataset 112 may be sent to the dataset consumer 106. Avoiding the transfer of the dataset across the internet or another wide area network (WAN), may reduce the amount of time needed to get the results and may avoid data transfer costs.

The data items 114 in the dataset 112 may be pre-tagged with license tags, or the dataset provider 102 may run a tagging process to tag items in the dataset with license tags. In generating the license file 118, various formats may be used including, for example, JavaScript object notation (JSON) or any other file format that capable of expressing attribute-value pairs. The dataset 112 is now described in further detail with reference to FIG. 2.

Figure 2:
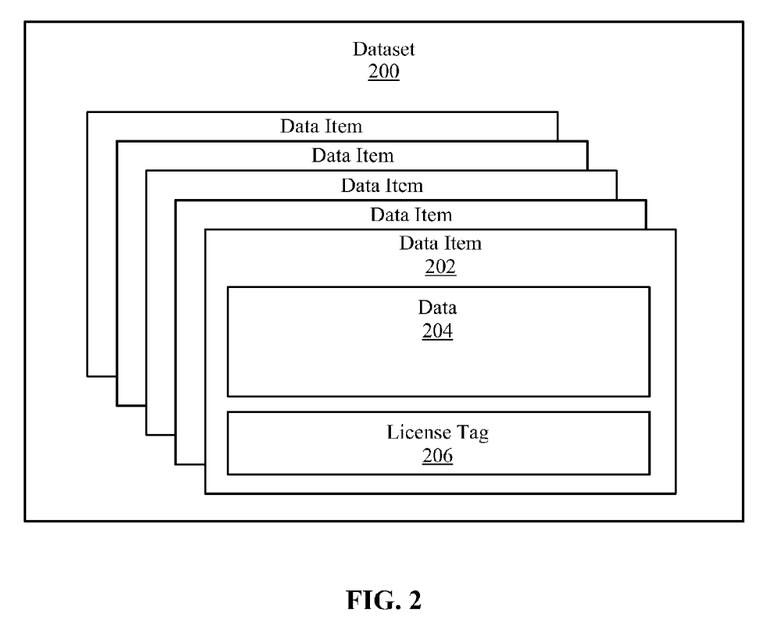
FIG. 2 is a schematic overview of an example dataset that may be used in a dataset licensing system.

Accordingly, FIG. 2 is a schematic overview of an example dataset 200 that may be used in a dataset licensing system. As depicted, the dataset 200 may include multiple data items. Moreover, each data item, including the depicted data item 202, may include a data portion 204 and the license tag 206.

As an example, the datasets 200 may include information about ocean floor topography or information about ocean floor geological structures. Thus, the data item 202 may include a data portion 204 that may include a longitude-latitude coordinate, a radius and an elevation or geological structure, for instance. The license tag 206, as an example, may represent a silver, gold or platinum license to the dataset 200. A silver license, for instance, may include a relatively crude resolution of the ocean floor. Data items within the silver license may include 100 mile radiuses in the data portions of the data items. In contrast, a gold license may include a medium resolution of the ocean floor with 10 mile radiuses, and a platinum license may include a high-resolution of the ocean floor with 100 feet radiuses. Other examples of the dataset 200 may include genome data for various species, neuroimaging of human brains or other animals, financial data and salinity levels at various points in estuaries around the world.

A dataset 200 may be provided in various formats including a JavaScript notation object (JSON) file, a spreadsheet, a relational database, a comma-separated values (CSV) file, a not only structured query language (NoSQL) database, an object-oriented database or any other means whereby a dataset may be provided as a tagged dataset. In some examples, a dataset may be provided which is untagged in an original format. In this way, data items in the dataset may be tagged with license tags to transform an untagged dataset in an original format to a dataset that is tagged with license tags prior to running the query against the dataset.

As one example, the dataset 200 may be provided in a distributed database such as the Hadoop Database (HBase). HBase is generally run on top of a distributed file system such as the Hadoop Distributed File System (HDFS™). Moreover, HDFS may be used in conjunction with a map-reduce framework on a computer cluster such as APACHE™ HADOOP®.

APACHE™ HADOOP® is a framework that generally supports data-intensive distributed applications. In particular, APACHE™ HADOOP® may support the running of map-reduce applications on large computer clusters. Map-reduce is a programming model in which an application is divided into many small fragments of work, each of which may be executed or re-executed on any node in the computer cluster. Additionally, APACHE™ HADOOP® may provide a distributed file system (e.g. HDFS™) that stores data on compute nodes within the computer cluster. Thus, the distributed file system may provide relatively high aggregate processing power across the computer cluster for quick access for processing by the map-reduce application. In addition to a relatively high aggregate processing power, both the map portion and the reduce portion of a map-reduce application may be enhanced by use of the distributed file system since many distributed file systems (e.g. HDFS™) are designed so that node failures in the computer cluster are automatically handled through data replication across the distributed file system. Moreover, frameworks such as APACHE™ HADOOP® may enable map-reduce applications to work with hundreds or thousands of independent computers and exabytes or petabytes of data. Thus, large datasets 200 may be used by applications to produce results for a customer.

While APACHE™ HADOOP® is written in the JAVA® programming language, and while many map-reduce applications using APACHE™ HADOOP® are written in the JAVA® programming language, a person skilled in the art should recognize that any programming language may be used to implement a map or reduce portion of a map-reduce application.

Additionally, the license tag 206 may include multiple tags. For example, with global geospatial data, the data item 202 may represent a geographic point in southern Germany and the license tag 206 may include a tag for the Free State of Bavaria (e.g. "BY") as well as a tag for the Federal Republic of Germany (e.g. "DE"). In this way, the license tag 206 includes at least two tags. Other tags may also be included such as the European Union (e.g. "EU") or other dimensional information, such as the Eurozone (e.g. "EUR" for financial analyses) or the German language (e.g. "DEU"). Thus, the licensing tags may provide varying levels of licensing scope for the same data items 202 or data 204.

Figure 3:
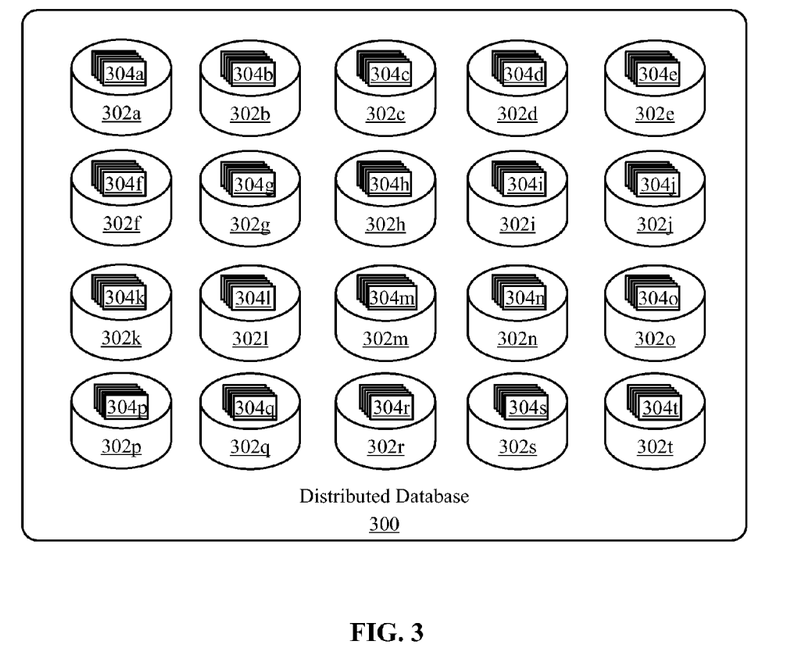
FIG. 3 is a schematic overview of an example distributed database that may be used in a dataset licensing system.

To further describe the technology, reference is now made to FIG. 3 which is a schematic overview of an example distributed database 300 that may be used in a dataset licensing system. As depicted, the distributed database 300 may include multiple data stores 302a-t. Each data store 302 may contain one or more data items 304a-t. As a group, the data items 304a-t may comprise a dataset. The data items 304a-t may be replicated across one or more data stores 302 to provide fault tolerance or higher data access throughput. Thus, the dataset may be provided in the distributed database 300.

Each data store 302 may reside on one or more computers of a computer cluster. Alternatively, a single computer in a computer cluster may contain multiple data stores 302. Moreover, computers in the computer cluster may be grouped together on a server rack and connected to various network components such as switches and routers. Thus, the distributed database may operate on top of a distributed file system.

Proximity of the computers in the computer cluster may be defined by physical proximity on the same computer rack, for instance, or through network proximity. For example, computers in the computer cluster connected to a common networking switch may be proximately close in the network, since communication between the computers connected to the common networking switch may not have to traverse a networking router.

Likewise, data stores 302 may be proximate to one another as defined by physical proximity or communicative latency, for example. Data stores 302 in the same computer within a computer cluster may be both physically proximate and communicatively proximate, since data transmitted between data stores in the same computer may not have to traverse the computer network.

Proximity of data stores 302 and computers in the computer cluster may affect efficiency of a map-reduce application. In executing a map-reduce application, data may need to be obtained from remote data stores 302. Thus, proper or improper organization of the dataset across the distributed database 300 may increase or decrease efficient processing of the dataset.

Figure 4:
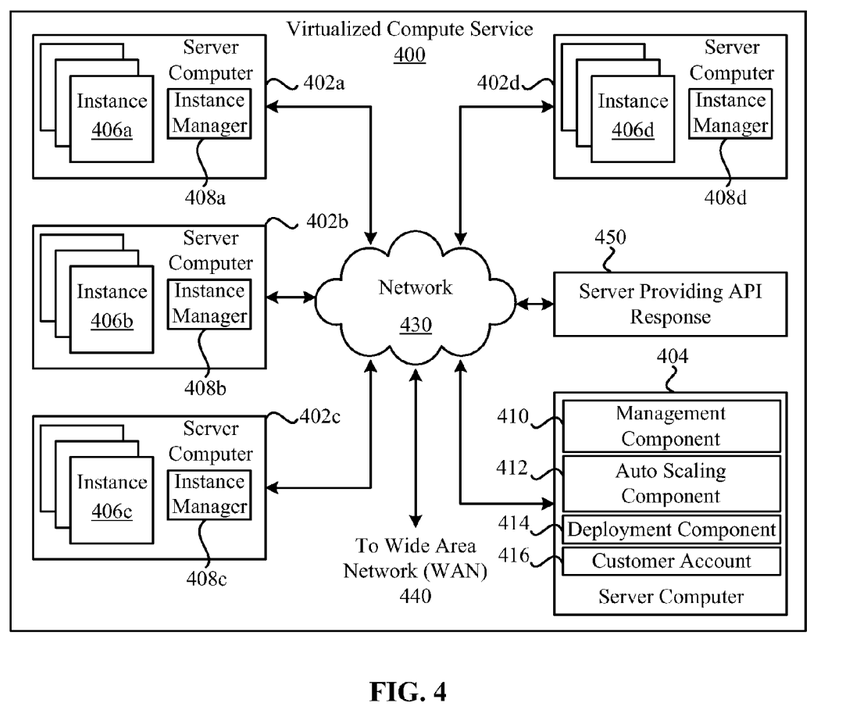
FIG. 4 is a component block diagram illustrating an example virtualized compute system to license datasets.

FIG. 4 is a component block diagram illustrating an example virtualized compute system 400 that may be used to license datasets. In particular, the virtualized compute service 400 is depicted that illustrates one environment in which the technology described herein may be used. The virtualized compute service 400 is one type of environment that includes various virtualized service resources that may be used, for instance, to host a computer cluster or virtualized computing instances. For example, the virtualized compute service may implement nodes of a data store cluster or computer cluster using the instances, as described later in the virtualized compute service. A specific deployment of the technology on a virtualized compute service is described with additional detail in FIG. 5.

The virtualized compute service 400 (i.e., the cloud provider) is capable of delivery of computing and storage capacity as a service to a community of end recipients. In one example, the virtualized compute service may be established for an organization by or on behalf of the organization. That is, the virtualized compute service 400 may offer a "private cloud environment." In another example, the virtualized compute service 400 may support a multi-tenant environment, wherein a plurality of customers may operate independently (i.e., a public cloud environment). Generally speaking, the virtualized compute service 400 may provide the following models: Infrastructure as a Service ("IaaS"), Platform as a Service ("PaaS"), and/or Software as a Service ("SaaS"). Other models may be provided. For the IaaS model, the virtualized compute service 400 may offer computers as physical or virtual machines and other resources. The virtual machines may be run as guests by a hypervisor, as described further below. The PaaS model delivers a computing platform that may include an operating system, programming language execution environment, database, and web server. Application developers may develop and run their software solutions on the virtualized compute service platform without incurring the cost of buying and managing the underlying hardware and software. The SaaS model allows installation and operation of application software in the virtualized compute service. End users may access the virtualized compute service 400 using networked client devices, such as desktop computers, laptops, tablets, smartphones, etc. running web browsers or other lightweight client applications, for example. Those skilled in the art will recognize that the virtualized compute service 400 may be described as a "cloud" environment.

The particularly illustrated virtualized compute service 400 includes a plurality of server computers 402a-d. While four server computers are shown, any number may be used, and large centers may include thousands of server computers. The server computers 402a-d may provide computing resources for executing software instances 406a-d. Instances 406a-d may, for example, be virtual machines. As known in the art, a virtual machine is an instance of a software implementation of a machine (i.e. a computer) that executes applications like a physical machine. In the example of virtual machine, each of the servers 402a-d may be configured to execute an instance manager 408a-d capable of executing the instances. The instance manager 408a-d may be a hypervisor or another type of program configured to enable the execution of multiple instances 406 on a single server. Additionally, each of the instances 406 may be configured to execute one or more applications.

It should be appreciated that although this discussion is primarily in the context of virtual machines, other types of instances may be utilized with the concepts and technologies disclosed herein. For instance, the technologies disclosed herein may be utilized with storage resources, data communications resources, and with other types of computing resources. The technology might also execute all or a portion of an application directly on a computer system without utilizing virtual machine instances.

One or more server computers 404 may be reserved for executing software components for managing the operation of the server computers 402 and the instances 406. For example, a server computer 404 may execute a management component 410. A customer may access the management component 410 to configure various aspects of the operation of the instances 406 purchased by the customer. For example, the customer may purchase, rent or lease instances and make changes to the configuration of the instances. The customer may also specify settings regarding how the purchased instances are to be scaled in response to demand. An auto scaling component 412 may scale the instances 406 based upon rules defined by the customer. The auto scaling component 412 may allow a customer to specify scale-up rules for use in determining when new instances should be instantiated and scale-down rules for use in determining when existing instances should be terminated, for example. The auto scaling component 412 may consist of a number of subcomponents executing on different server computers 402 or other computing devices. The auto scaling component 412 may monitor available computing resources over an internal management network and modify resources available based on need.

A deployment component 414 may be used to assist customers in the deployment of new instances 406 of computing resources. The deployment component may have access to account information associated with the instances, such as who is the owner of the account, credit card information, country of the owner, etc. The deployment component 414 may receive a configuration from a customer that includes data describing how new instances 406a-c may be configured. For example, the configuration may specify one or more applications to be installed in new instances 406a-c, provide scripts and/or other types of code to be executed for configuring new instances 406a-c, provide cache logic specifying how an application cache should be prepared, and other types of information. The deployment component 414 may utilize the customer-provided configuration and cache logic to configure, prime, and launch new instances 406. The configuration, cache logic, and other information may be specified by a customer using the management component 410 or by providing this information directly to the deployment component 414.

Customer account information 416 may include any desired information associated with a customer of the multi-tenant environment. For example, the customer account information may include a unique identifier for a customer, a customer address, billing information, licensing information, customization parameters for launching instances, scheduling information, auto-scaling parameters, etc. As described above, the customer account information 416 may also include security information used in encryption of asynchronous responses to API requests. By "asynchronous" it is meant that the API response may be made at any time after the initial request and with a different network connection.

A network 430 may be utilized to interconnect the server computers 402a-d and the server computers 404, 450. The network 430 may be a local area network (LAN) and may be connected to a Wide Area Network (WAN) 440 or the internet so that end users may access the virtualized compute service 400. It should be appreciated that the network topology illustrated in FIG. 5 has been simplified and that many more networks and networking devices may be utilized to interconnect the various computing systems disclosed herein.

A server computer 450 is shown that may be a web server used to deliver web services to a plurality of client computers. The server 450 may be configured to respond to API requests asynchronously and to use the customer account 416 if needed in generation of the response. In one example, generation of the API response may include using security information in the API request coordinated with security information in the customer account. For example, security information regarding how to encrypt the response may be stored in the customer account. As another example, a customer may request the license file through an API on the server 450 and in response to the request may be sent the license file. Moreover, in using such an API, an access control policy may be applied by the server 450. For instance, certain users may be identified and granted access to the license file through an API on the server 450, while other users may be denied access to the license file.

Figure 5:
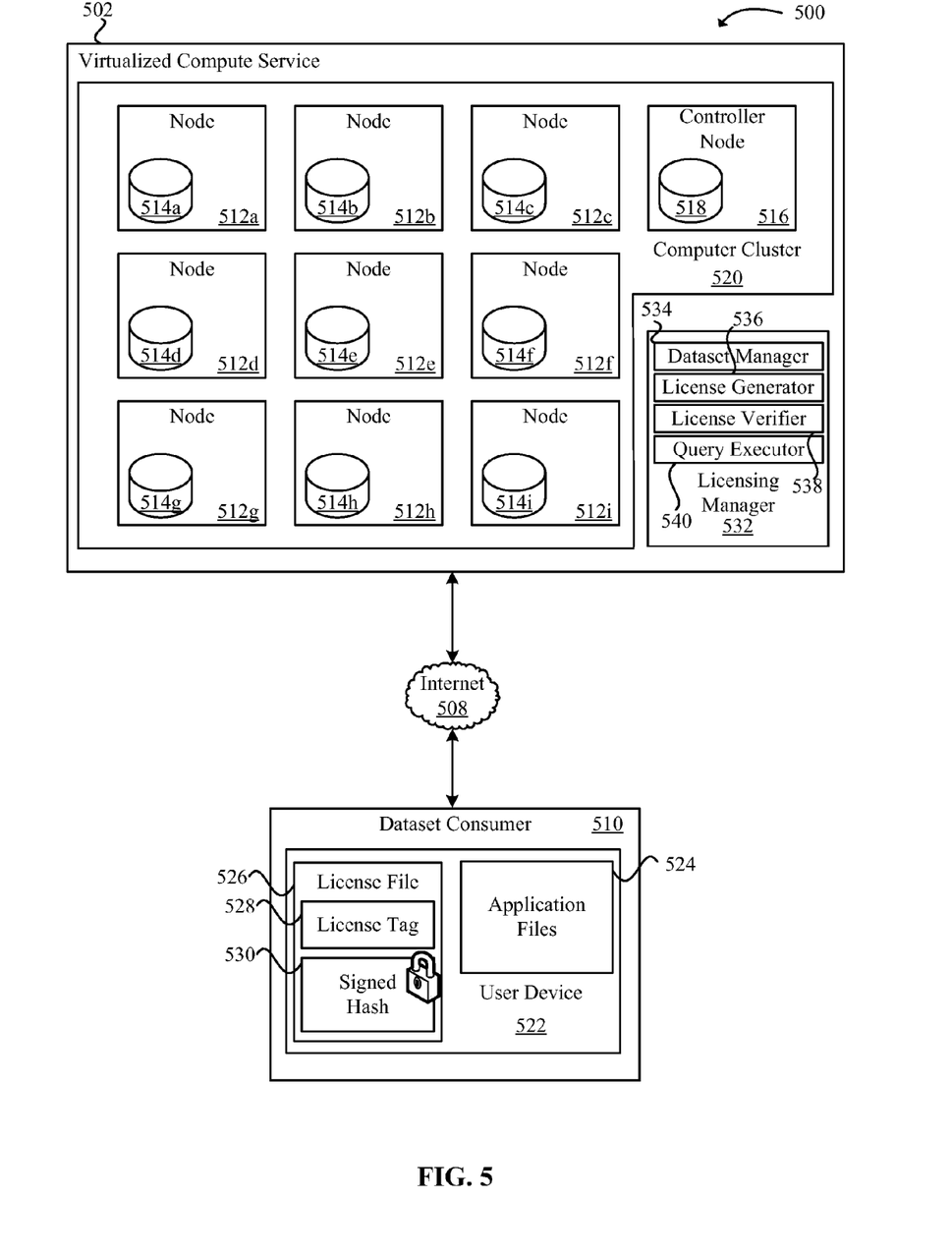
FIG. 5 is a component block diagram illustrating an example dataset licensing system.

To more clearly describe the technology, reference is now made to FIG. 5 in which a component block diagram illustrating an example dataset licensing system 500 is shown. The dataset licensing system 500 may be used to implement the functionality heretofore described with reference to FIGS. 1-4 or other exemplary functionality discussed below. The virtualized compute service 400, discussed with reference to FIG. 4, may be one environment in which the components of the dataset licensing system 500 may be implemented. More particularly, the virtualized compute service 400 shows some implementation details of the virtualized compute service 502 which may be used, as depicted, to host a computer cluster or virtualized computing instances. For example, the computer cluster 520 may be used to host a distributed database system with a dataset provided thereon. The dataset licensing system 500 may include a virtualized compute service 502. The virtualized compute service 502 may be communicatively connected over the Internet 508 to a dataset consumer 510.

The virtualized compute service 502 may include a plurality of commodity computer systems, as discussed in FIG. 4. For example, computers employing standard or common architectures may be used such as central processing units (CPUs) implementing the x86 or x86-64 instruction set architectures. Other components such as hard disks (HDs) and random access memory (RAM) chips may also employ standard or common interfaces such as serial advanced technology attachment (SATA), small computer system interface (SCSI), integrated drive electronics (IDE), fiber channel (FC) or dual in-line memory modules (DIMMS). Moreover, networking components may employ standard protocol such as Ethernet and the Internet protocol (IP).

The virtualized compute service 502 may include one or more hypervisors, as discussed in FIG. 4. A hypervisor may be computer software, firmware or hardware that creates and runs virtual machines. The hypervisor may run one or more guest virtual machines on a host machine computer. The hypervisor may present the guest virtual machines' guest operating systems with a virtual operating platform and may manage the execution of the virtual machines' guest operating systems. Multiple instances of a variety of operating systems may share the virtualized hardware resources.

The virtualized compute service 502 may contain the nodes 512a-i, 516 that have been allocated to form a cluster 520. The cluster 520 may be used to execute map-reduce applications, database applications, or other distributed applications. Each node within the cluster 520 may contain, for example a virtual machine (VM), such as, an interpreter engine or a bytecode virtual machine. The JAVA® virtual machine, for instance, may be used where the application code is provided in JAVA® bytecode. As an alternative to such virtual machines or interpreter engines, a native application loader may load applications that include native machine code to be natively executed on the nodes 512a-i, 516 within the cluster 520.

In executing a map-reduce application, the cluster 520 may use a controller node 516 (or a set of controller nodes). Map-reduce applications may be submitted to the controller node 516 for execution across the cluster 520. The controller node 516 may then divide the computation work into tasks and push computational work out to the nodes 512a-i. Computation work may be performed by the nodes 512a-i in the cluster 520. Additionally, the controller node 516 may also perform some of this computation work and may utilize the data store 518 for storing portions of the dataset being worked on by the map-reduce application.

As previously discussed with reference to FIG. 1, for example, the dataset consumer 510 may include a user device 522. The user device may contain various files including the license file 526 and application files 524. As an example, the application files 524 may contain application code for a map-reduce application. The license file 526 may contain a signed hash 530 generated using a hash function and/or an asymmetric key.

Once the dataset consumer 510 has licensed access to a dataset in the computer cluster 520, the dataset provider may send the dataset consumer 510 the license file 526 for storage in the user device 522.

The dataset consumer 510 may then submit the license file 526 with the application files 524 to the computer cluster 520. The application files 524 may include queries to be executed against a dataset provided across the computer cluster 520 or processing to be performed with data items that have been licensed. For example, a query may be used to obtain the data that may be used in a mapping procedure in a distributed map-reduce application run across the computer cluster 520.

The license file 526 may also include a license tag referencing data items in the dataset tagged with the same license tag. In this way, a dataset may be provided with license tags attached to data items in the dataset and dataset licensing may be enforced through the submission of the license file 526. More particularly, by deploying the license file 526 to the user device 522, the user device 522 may be used to submit the application files 524 (e.g. files that may contain one or more queries or processing applications to be run against the dataset) to the computer cluster 520. Upon receiving the application files 524 and the license file 526, the computer cluster may then enforce the license file 526 (e.g. by using the signed hash 530 and the license tag 528). In deploying the license file 526, a hash value may be calculated for the license file 526 and the license file 526 may be signed with a key to form a signature as depicted by the signed hash 530. Thus, in enforcing the license file 526 a signature and hash may be verified and data items may be identified that have the license tag 528 attached thereto.

As the dataset may be provided in a distributed database running on top of a distributed file system, proximity of the data stores 514a-i and nodes 512a-i in the computer cluster 520 may affect the efficiency of the map-reduce application or other queries being executed against the dataset. In executing the map-reduce application or other queries, data may need to be obtained from data stores 514a-i located in a various nodes 514a-i. Thus, organization of the dataset across the computer cluster 520 may increase or decrease efficient processing of the dataset. Accordingly, grouping data items in a dataset that have a common license tag onto one or more proximate nodes in the computer cluster may increase performance. Alternatively, spreading data items in a data set that have a common license tag across non-proximate nodes in the computer cluster may advantageously increase reliability and fault tolerance. Grouping these data items in the dataset according to common license tag may be done by sorting the data items by license tag when arranging the data items on the nodes 514. A distributed database management system may be programmatically enhanced to perform some or all of this sorting and placement functionality automatically and transparently.

The virtualized compute service 502 may interface with the Internet 508. In this way, the virtualized compute service 502 may be able to communicate with the user device 522. Moreover the virtualized compute service 502 may include virtual networks between the nodes 512.

Alternatively, the dataset consumer 510 may communicate with the virtualized compute service 502 over any useful computing network, including an intranet, the Internet, a local area network (LAN), a wide area network (WAN), a wireless data network, or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired or wireless connections and combinations thereof.

Based on the aforementioned parameters, the user device 522 may be devices such as, but not limited to, a desktop computer, a laptop, a tablet, a mobile device, a television, a cell phone, a smart phone, a hand held messaging device, a set-top box, a gaming console, a custom data assistant, an electronic book reader, heads up display (HUD) glasses, or any device with a display that may receive and present the information.

The virtualized compute service 502 may comprise, for example, one or more server computers, virtual server images, or any other system providing computing capability. As one example, plurality of nodes 512 may be employed that are arranged, for example, in one or more server banks or computer banks or other arrangements to form a distributed computing system.

Various processes and/or other functionality, as discussed herein, may be executed in the licensing system 500 according to various examples. The virtualized compute service 502, may for example, provide some central server processing services while the user device 522 may provide local processing services and interface processing services to interface with the services of the virtualized compute service 502. Therefore, it is envisioned that processing services, as discussed herein, may be centrally hosted functionality or a service application that may receive requests and provide output to other services or customer devices.

For example, the services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. Like the various processing capabilities on the user device 522, a processor may provide processing instructions by communicating with a memory on each node 512*a-i* within the computer cluster 520. That is, the memory device may include instructions operable to be executed by the processor to perform a set of actions. The processor and/or the memory may directly or indirectly communicate with a data store 514*a-i*.

Various data may be stored in the data stores 514 that may be accessible to the node 512. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 514 may include storage systems such as a SAN (Storage Area Network), cloud storage network, volatile or non-volatile RAM, optical media, or hard-drive type media. A data store 514 may be representative of a plurality of data stores 514.

The dataset licensing system 500 may include a licensing manager 532 within the virtualized compute service 502 to manage licenses issued to dataset consumers. The licensing manager 532 may include a set of software modules, including a dataset manager module 534, a license generator module 536, a license verifier module 538 and a query executor module 540. The dataset manager module 534 may provide a dataset with license tags attached to data items in the dataset. The license generator module 536 may generate a license file having a license tag. The license verifier 538 may validate that the license file is correctly formatted and verify authenticity of the license file as queries and applications are executed against the dataset. Further, the query executor 540 may run a query against the dataset and enforce the license file.

In an alternative example configuration, the dataset and data items may be located in a separate data storage cluster (e.g., an HBase cluster) (not shown) that is separate from a computer cluster 520. In this case, the licensing manager 532 may use the license file 526 to determine the appropriate dataset(s) to be moved from the data store cluster to the computer cluster to be processed 520. The licensing manager 532 may also execute or arrange for a transfer of the appropriate dataset(s). Once a result is obtained from the computer cluster 520, then the result may be sent to a dataset consumer 510. This arrangement can provide a secure interaction with data to ensure that the data is not passed onto third parties and to ensure the integrity of the data.

Figure 6:
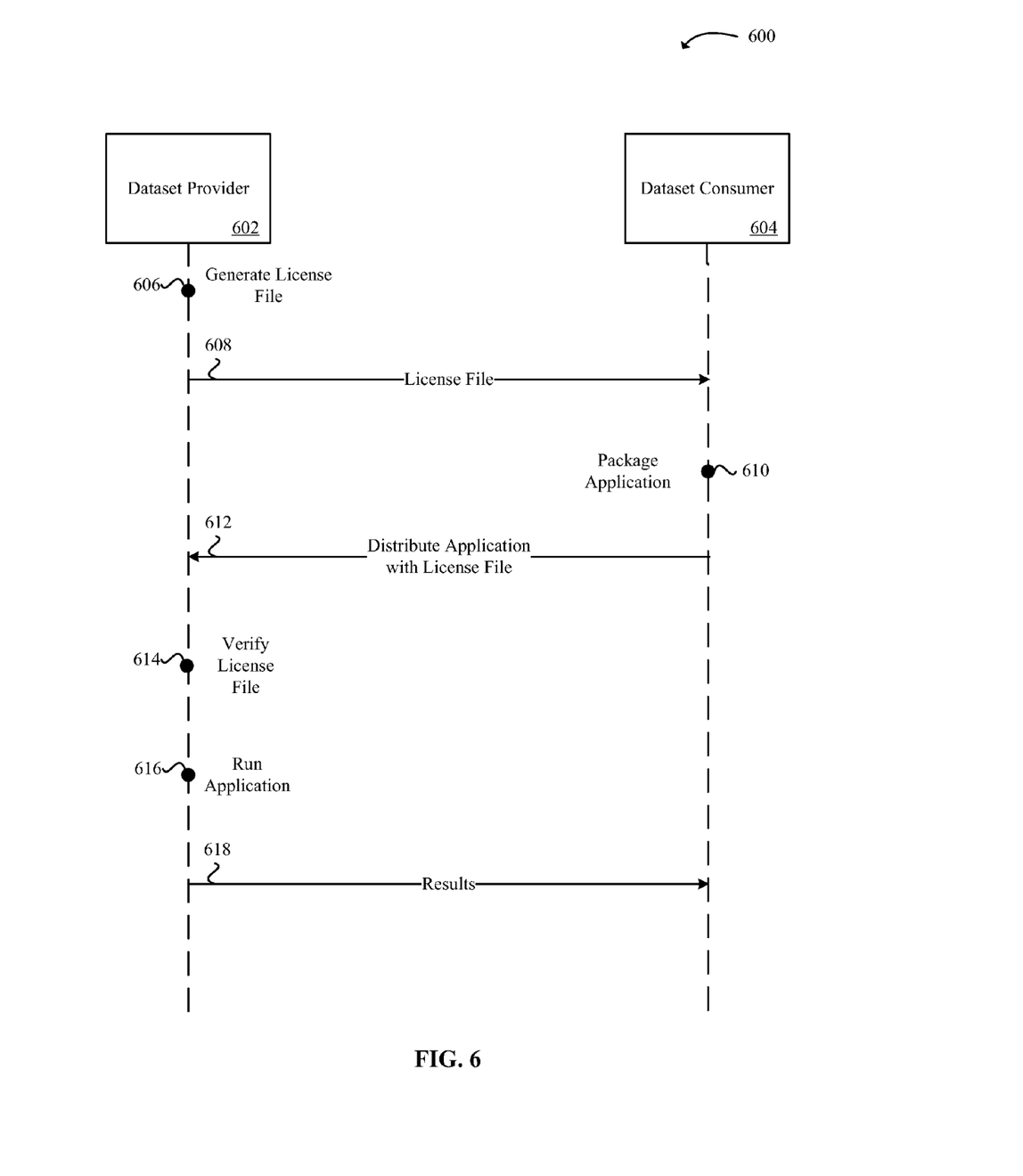
FIG. 6 is a sequence diagram illustrating dataset licensing.

FIG. 6 is a sequence diagram 600 illustrating dataset licensing. In particular, the sequence diagram 600 illustrates a sequence of interactions between a dataset provider 602 and a dataset consumer 604. The computer cluster or other services within the virtualized compute service may be used by the dataset provider 602 as described with reference to FIG. 4.

After a licensing agreement has been made, the dataset provider 602 may generate a license file 606 and send the license file 608 to the dataset consumer 604. The dataset consumer 604 may then provide or develop an application, such as a map-reduce application, to execute against the licensed dataset. In preparing to execute the application, the dataset consumer 604 may package the application as indicated by 610, and distribute the application to the dataset provider with the license file as indicated by 612. Alternatively, the application could be set up on a third party's computing cluster or the consumer's own computing cluster. In distributing the application, the dataset consumer 604 may package and submit the license file with the application or may submit the license file in a separate procedure.

Upon receiving the license file, the dataset provider 602 may verify the license file 614. For example, a signed hash may be computed and compared with a signed hash value contained in the license file to determine whether the license file is authentic or whether the license file has been tampered with. After verifying the license file 614, the dataset provider 602 may run the application 616 and may provide results 618 to the dataset consumer 604. Results 618 may be provided after the application has been fully executed, or in some examples may be provided in a streaming fashion as processing is finished on various parts of the dataset.

Figure 7:
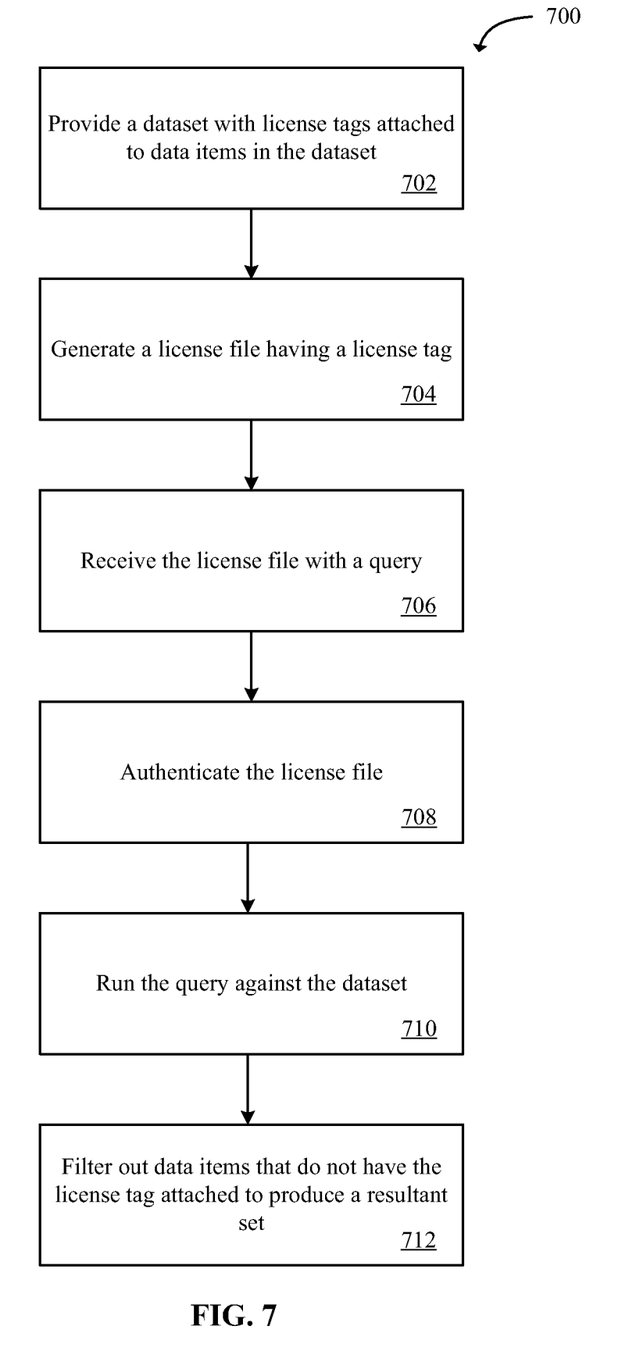
FIG. 7 is a flowchart illustrating an example of a method to license datasets.

FIG. 7 is a flowchart illustrating an example of a method 700 to enforce dataset licensing. In method element 702, a dataset may be provided with license tags attached to data items in the dataset. As an example, a geospatial dataset provider may provide a dataset of LiDAR (light and radar) data representing the United States. License tags may be attached to individual LiDAR data points referencing, for example, a geographic space. The geospatial dataset provider may then sell access to the dataset, or a subset thereof, to dataset consumers. Dataset consumers may, as an example, use the dataset to generate digital elevation models.

In method element 704, a license file may be generated having a license tag. A license file in the geospatial example may include a license tag of "Colorado" where a dataset consumer may be interested in licensing a subset of the dataset with geospatial data in the State of Colorado. In generating the license file, various formats may be used including, for example, JavaScript object notation (JSON) or any other file format that is capable of expressing attribute-value pairs.

In method element 706, the license file may be received, and, in method element 708, the license file may be authenticated. One example of an authentication mechanism may be calculating the hash value for license file and signing the hash value in the license file 118. Thus, the license file may be authenticated by comparing the license file with a recalculated hash value and signature.

In method element 710, the query may be run against the dataset, and, in method element 712, data items may be filtered out that do not have the license tag attached to produce a resultant set. For example, a query may be run as part of a map procedure in a distributed map-reduce application run across the computer cluster. The dataset may be distributed across the computer cluster.

Figure 8:
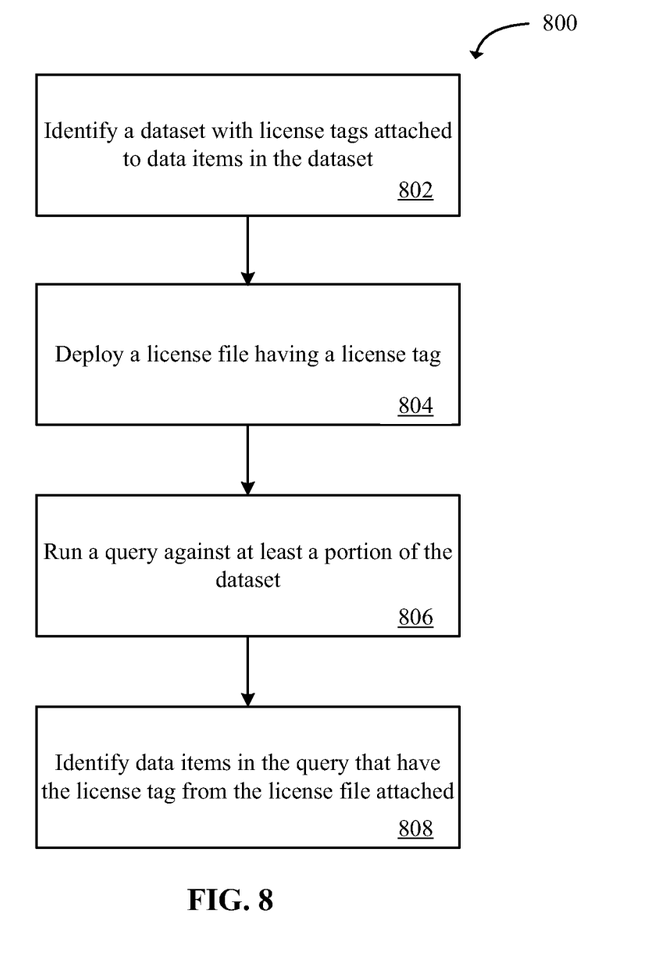
FIG. 8 is a flowchart illustrating another example of a method to license datasets.

FIG. 8 is a flowchart illustrating another example of a method 800 to enforce dataset licensing. In method element 802, a dataset may be provided with license tags attached to data items in the dataset. A license tag, as an example, may represent a silver, gold or platinum license to the dataset. A silver license, for instance, may include a relatively crude resolution of the ocean floor. Data items within the silver license may include 100 mile radiuses is in the data portions of the data items. In contrast, a gold license may include a medium resolution of the ocean floor with 10 mile radiuses, and a platinum license may include a high-resolution of the ocean floor with 100 feet radiuses. Other examples of the dataset may include genome data for various species, neuroimaging of human brains or other animals, financial data and salinity levels at various points in estuaries around the world.

In method element 804, a license file may be deployed having a license tag. In deploying the license file, a hash value may be calculated for the license file and the license file may be signed with a key to form a signature, as one example. In method element 806, a query may be run against at least a portion of the dataset with the license file, and in the method element 808, data items may be identified that have the license tag attached. An application with queries to the dataset, for example, may be submitted with the license file. The license file may then be enforced, for instance, by using an authentication mechanism to authenticate the license file and filter out non-licensed data items.

The technology may allow dataset providers to enforce licenses issued to dataset consumers. Distributed computing techniques, such as the map-reduce model may be used to quickly and efficiently execute applications against these datasets. In this way, dataset providers may be able to license portion of a dataset to a dataset consumer and may have a mechanism to enforce the license when a dataset consumer's application runs against the dataset. Thus, dataset providers may be assured that a dataset consumer may only access a licensed portion of a dataset. More importantly, the dataset consumer may be restricted from using unlicensed portions of the dataset when running an application against the dataset.

Figure 9:
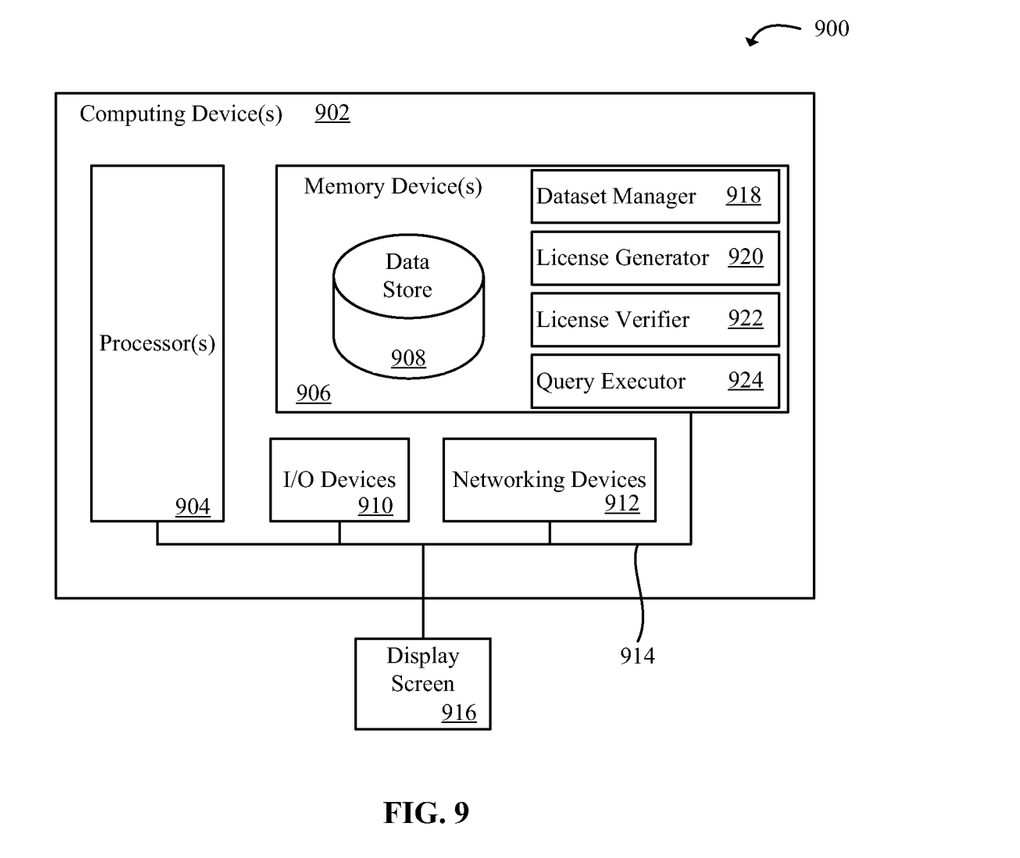
FIG. 9 is block diagram illustrating an example of a computing device that may be used for dataset licensing.

FIG. 9 is block diagram illustrating an example of a computing device 900 that may be used for dataset licensing. In particular, the computing device 902 illustrates a high level example of a device on which modules of the disclosed technology may be executed. The computing device 902 may include one or more processors 904 that are in communication with memory devices 906. The computing device 902 may include a local communication interface 924 for the components in the computing device. For example, the local communication interface may be a local data bus and/or any related address or control busses as may be desired.

The computing device 902, for instance, may be used for data access. For example, the computing device 902 may be used to secure computer instructions of a distributed application. The memory device 906 may contain a set of modules 918 that are executable by the processor(s) 904 and data for the modules. Located in the memory device 906 may be the set of modules, including a dataset manager module 918, a license generator module 920, a license verifier module 922, a query executor module 924 and other modules executable by the processor 904. The set of modules may execute the functions described earlier. For example, the dataset manager module 918 may provide a dataset with license tags attached to data items in the dataset. The license generator module 920 may generate a license file having a license tag. The license verifier 922 may verify authenticity of the license file. The query executor 924 may run the query against the dataset and enforce the license file. A data store 908 may also be located in the memory device 906 for storing data related to the modules and other applications along with an operating system that is executable by the processor(s) 904.

Other applications may also be stored in the memory device 906 and may be executable by the processor(s) 904. Components or modules discussed in this description that may be implemented in the form of software using high level programming languages that are compiled, interpreted or executed using a hybrid of the methods. Thus, a communication interface may be used to communicate the license file, to receive a query and send a result from the query The computing device may also have access to I/O (input/output) devices 910 that are usable by the computing devices. An example of an I/O device is a display screen 916 that is available to display output from the computing devices. Other known I/O devices may be used with the computing device as desired. Networking devices 912 and similar communication devices may be included in the computing device. The networking devices 912 may be wired or wireless networking devices that connect to the internet, a LAN, WAN, or other computing network.

The components or modules that are shown as being stored in the memory device 906 may be executed by the processor(s) 904. The term "executable" may mean an application file that is in a form that may be executed by a processor 904. For example, an application in a higher level language may be compiled into machine code in a format that may be loaded into a random access portion of the memory device 906 and executed by the processor 904, or application code may be loaded by another executable application and interpreted to generate instructions in a random access portion of the memory to be executed by a processor. The executable application may be stored in any portion or component of the memory device 906. For example, the memory device 906 may be random access memory (RAM), read only memory (ROM), flash memory, a solid state drive, memory card, a hard drive, optical disk, floppy disk, magnetic tape, or any other memory components.

The processor 904 may represent multiple processors and the memory device 906 may represent multiple memory units that operate in parallel to the processing circuits. This may provide parallel processing channels for the processes and data in the system. The local communication interface 914 may be used as a network to facilitate communication between any of the multiple processors and multiple memories. The local communication interface 914 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different applications and across several memory devices. Similarly, operational data may be identified and illustrated herein within modules and may be embodied in any suitable form and organized within any suitable type of data structure. The operational data may be collected as a single dataset, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, application modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, application modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented method to license datasets, comprising:
    under control of one or more computer systems configured with executable instructions:
        providing a dataset with license tags attached to data items in data rows in the dataset, wherein each data row for the data items comprises a license tag and the license tags identify at least one license that is associated with the each data row for the data items, using a processor;
        generating a license file having a selected license tag, using the processor;
        generating a digital signature for the license file, wherein a hash value is calculated for the license file and the hash value is signed with a key;
        receiving the license file with a query;
        authenticating the license file by verifying the digital signature, using the processor;
        running the query against the dataset, using the processor; and
        filtering out data items in data rows that do not have the selected license tag attached to produce a resultant set, using the processor.

2. The method of claim 1, further comprising tagging data items in the dataset with license tags prior to running the query against the dataset.

3. The method of claim 1, wherein the dataset is provided in a distributed database.

4. The method of claim 1, wherein the query is part of a map procedure in a distributed map-reduce application run across a computer cluster.

5. A computer implemented method to license datasets, comprising:
    under control of one or more computer systems configured with executable instructions:
        identifying a dataset in a distributed database that operates on top of a distributed file system having license tags attached to data items in data rows, wherein each data row for the data items comprises a license tag and the license tags identify at least one license that is associated with the each data row for the data items in the dataset, using a processor;

deploying a license file having a selected license tag used in querying the dataset, using the processor;

running a query against at least a portion of the dataset, using the processor; and identifying data items in the query that have the selected license tag from the license file attached to the data items, using the processor.

6. The method of claim 5, wherein the license file is a JavaScript Object Notation (JSON) file.

7. The method of claim 5, wherein the dataset is provided in at least one of a JavaScript Object Notation (JSON) file, a spreadsheet, a relational database, a comma-separated values (CSV) file, a not only structured query language (NoSQL) database, or an object-oriented database.

8. The method of claim 5, wherein each data row for the data items further comprise, a first data row having a license tag associated with a first license and a second data row having a second license tag associated with a second license and the second data row having the second license tag is filtered out of the data items to produce a resultant set containing the first data row.

9. The method of claim 5, wherein the query is part of a map procedure in a distributed map-reduce application run across a computer cluster.

10. The method of claim 9, further comprising grouping data items in the dataset that have a common license tag onto one or more proximate nodes in the computer cluster.

11. The method of claim 5, wherein deploying the license files comprises:

calculating a hash value for the license file; and signing the hash value with a key to form a signature.

12. The method of claim 11, further comprising verifying the signature.

13. The method of claim 5, wherein the query is run against identified data items that have the license tag from the license file attached.

14. The method of claim 5, wherein deploying the license file comprises:

receiving through a web service application programming interface (API) a request for the license file; and sending the license file in response to the request.

15. A system to license datasets, comprising:

a processor;

a memory device including instructions to be executed by the processor;

a distributed database management system operating on top of a distributed file system to provide a dataset with license tags attached to data items in data rows, wherein each data row for the data items comprises a license tag and the license tags identify at least one license that is associated with the each data row for the data items in the dataset;

a license generator to generate a license file having a selected license tag;

a communication interface to communicate the license file, to receive a query and to send a result from the query;

a license verifier to verify authenticity of the license file; and a query executor to run the query against the dataset and to identify data items that have the selected license tag attached and thereby apply the license file.

16. The system of claim 15, wherein the query is part of a map procedure in a distributed map-reduce application run across a computer cluster.

17. The system of claim 16, further comprising grouping items in the dataset that have a common license tag onto one or more proximate nodes in the computer cluster.

* * * * *